United States Patent [19]

Sugimori

[11] Patent Number: 4,617,142

[45] Date of Patent: Oct. 14, 1986

[54] CYCLOHEXANECARBONYLIC ACID ETHYL ESTER DERIVATIVES

[75] Inventor: Shigeru Sugimori, Fujisawa, Japan

[73] Assignee: Chisso Corporation, Ohsaka, Japan

[21] Appl. No.: 717,040

[22] Filed: Mar. 28, 1985

[30] Foreign Application Priority Data

Apr. 10, 1984 [JP] Japan .................. 59-71595

[51] Int. Cl.[4] ............... C09K 3/34; G02F 1/13; C07C 69/74; C07C 69/76
[52] U.S. Cl. ................... 252/299.63; 252/299.5; 350/350 R; 350/350 S; 560/1; 560/59; 560/102; 560/118; 560/126
[58] Field of Search ............ 252/299.5, 299.63; 350/350 R, 350 S; 560/59, 102, 118, 126, 1

[56] References Cited

U.S. PATENT DOCUMENTS

| | | | |
|---|---|---|---|
| 4,229,315 | 10/1980 | Krause et al. | 252/299.63 |
| 4,261,651 | 4/1981 | Gray et al. | 252/299.63 |
| 4,455,443 | 6/1984 | Takatsu et al. | 252/299.63 |
| 4,507,222 | 2/1985 | Inoue et al. | 252/299.63 |

FOREIGN PATENT DOCUMENTS

| | | | |
|---|---|---|---|
| 87032 | 8/1983 | European Pat. Off. | 252/299.63 |
| 104327 | 4/1984 | European Pat. Off. | 252/299.63 |
| 3225290 | 1/1984 | Fed. Rep. of Germany | 252/299.63 |
| 105701 | 5/1974 | German Democratic Rep. | 252/299.63 |
| 155063 | 5/1982 | German Democratic Rep. | 252/299.63 |
| 155078 | 5/1982 | German Democratic Rep. | 252/299.63 |
| 5976027 | 4/1984 | Japan | 252/299.63 |

OTHER PUBLICATIONS

Verbit, L., et al., Liq. Cryst. Ordered Fluids, vol. 2, pp. 307-314 (1973).
Takamuku; S., et al., Nippon Kagaku Kaishi, vol. 1, pp. 67-74 (1984).

*Primary Examiner*—Teddy S. Gron
*Attorney, Agent, or Firm*—Beall Law Offices

[57] ABSTRACT

A liquid crystal compound having a positive value of dielectric anisotropy and a low viscosity and being capable of extending the mesomorphic range of liquid crystal composition toward its lower region, and a liquid crystal composition containing the same are provided, which compound is a trans-4-substituted-cyclohexanecarboxylic acid β-(4-halogenophenyl) ethyl ester derivative expressed by the general formula

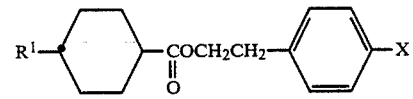

wherein $R^1$ represents $R^2$,

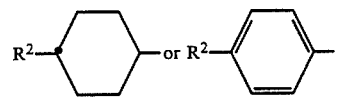

wherein $R^2$ represents an alkyl group or an alkoxy group, each having 1 to 15 carbons and X represents F or Cl.

2 Claims, No Drawings

CYCLOHEXANECARBONYLIC ACID ETHYL ESTER DERIVATIVES

BACKGROUND OF THE INVENTION

1. Field of the Invention

This invention relates to a cyclohexanecarboxylic acid ethyl ester derivative as a novel compound and a liquid crystal compositions containing the same.

2. Description of the Prior Art

Display elements utilizing liquid crystals have been broadly used for watches, electric calculators, etc. These liquid-crystalline display elements utilize the optical anisotropy and dielectric anisotropy of liquid-crystalline substances, and liquid-crystalline phases include nematic liquid-crystalline phase, smectic liquid-crystalline phase and cholesteric liquid-crystalline phase. Currently, display elements using nematic liquid crystals among those of the above phases have most widely been practically used. Such display elements include those of TN type (twisted nematic type), DS type (dynamic scattering type), guest-host type, DAP type, etc., and properties required for those of the respective types vary. As for liquid crystal compounds used for these display elements, there are preferred those which exhibit liquid-crystalline phases within a temperature range as broad as possible in the natural world, but at present there is no single compound which satisfies such a condition; hence several kinds of liquid crystal compounds and if required, non-liquid-crystalline compounds have been admixed for practical use. These compounds are required to be stable to moisture, light, heat, air, etc., and further it is preferred that the threshould voltage and saturation voltage required for driving display elements are as low as possible.

Still further, due to notable recent technical advance of liquid crystal display elements, liquid crystals having low viscosities have been required.

As a compound for such purposes, the following compound is known:

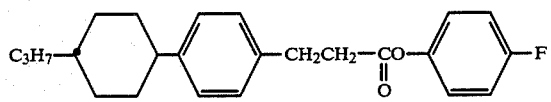

(European patent publication No. 0104327, page 23, lines 13-14)

This compound has a m.p. of 97° C. and a N-I point of 55° C.

The object of the present invention is to provide a liquid crystal compound having a positive value of dielectric anisotropy and a low viscosity and being capable of extending the mesomorphic range of liquid crystal composition toward its lower region.

SUMMARY OF THE INVENTION

The present invention resides in a trans-4-substituted-cyclohexanecarboxylic acid β-(4-halogenophenyl) ethyl ester derivative expressed by the general formula

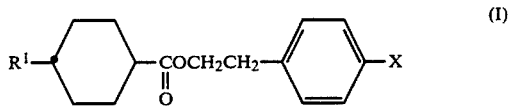

wherein R1 represents R2,

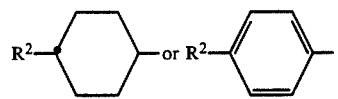

wherein $R^2$ represents an alkyl group or an alkoxy group, each having 1 to 15 carbons and X represents F or Cl, and a liquid crystal composition containing the same.

DETAILED DESCRIPTION OF THE PREFERRED EMBODIMENTS

Compounds of the formula (I) wherein $R^1$ represents $R^2$ or

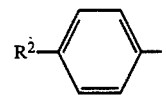

are monotropic liquid crystals having a liquid-crystalline-clearing point of 20° C. or lower, and those of the formula (I) wherien $R^1$ represents

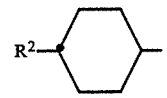

have a liquid-crystalline-clearing point of 50° C. or higher, and when they are added to a liquid crystal compositon, it is possible to extend the mesomorphic range toward its higher temperature region or lower temperature region. Any of the compounds of the present invention have a dielectric anisotropy value of about +2, and also have a good stability to moisture, heat, light, etc.

Next, preparation of the compounds of the present invention will be illustrated.

A trans-4-substituted-cyclohexanecarboxylic acid chloride is reacted with a β-(4-halogenophenyl) ethyl alohol (wherein the halogen is F or Cl) in the presence of pyridine to obtain the objective trans-4-substituted-cyclohexanecarbonylic acid β-(4-halogenophenyl) ethyl ester derivative. The above preparation is shown by the following chemical equation:

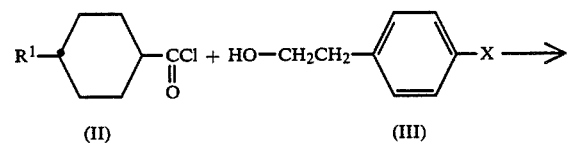

-continued

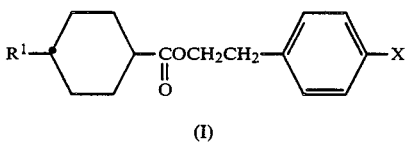

(I)

In the above equation, $R^1$ and X are as defined above.

Examples of compounds which are compatible with at least one of the compounds of the present invention expressed by the above formula (I) and constitute the liquid crystal composition of the present invention are liquid crystal compounds of other types such as Schiff base compounds, azoxy compounds, ester compounds, biphenyl compounds, phenylcyclohexane compounds, heterocyclic compounds such a phenylpyrimidine, etc.

The compounds of the present invention will be described in more detail by way of Examples and Application examples.

In these examples, crystalline phase, smectic phase, nematic phase and transparent phase are abbreviated to C, Sm, N and I, respectively.

EXAMPLE 1

Preparation of trans-4-(trans-4-ethylcyclohexyl) cyclohexanecarboxylic acid β-(4-fluorophenyl) ethyl ester.

A solution of β-(4-fluorophenyl) ethyl alcohol (1.7 g, 0.012 mol) dissolved in pyridine (10 ml) was added with stirring to trans-4-(trans-4-ethylcyclohexyl) cyclohexanecarboxylic acid chloride (2.6 g, 0.01 mol), followed by alowing the resulting reation liquid to stand overnight, thereafter adding water (100 ml), then extracting the resulting oily substance with toluene (100 ml), washing the toluene layer with 6N-HCl and then with 2N-NaOH, further washing with water till the washing water became neutral, filtering, distilling off toluene under reduced pressure, and recrystallizing the residual crystals from ethyl alcohol to obtain the objective trans-4-(trans-4-ethylcyclohexyl) cyclohexanecarboxylic acid β-(4-fluorophenyl) ethyl ester (2.1 g, yield 58%). This compound had a melting point of 66.0°-66.6° C. and a N-I point of 49.1° C.

EXAMPLES 2-12

Other ethyl ester derivatives were prepared in the same manner as in Example 1. The results are shown in Table 1 together with those of Example 1. In this Table, the numeral figures between points . below the abbreviations expressing the respective phases represent transition points; the symbol—shows that the phases are absent; the symbol ( ) represents monotropic; and the symbol * represents extrapolated value.

TABLE 1

| | Constitution of ester derivative | | Phase and transition (°C.) | | | |
|---|---|---|---|---|---|---|
| | $R^1$ | X | C | Sm | N | I |
| Example 1 | $C_2H_5$—⬡— | F | ● 66.0~66.6 | — | — | (49.1) ● |
| Example 2 | $C_3H_7$—⬡— | F | ● 76.0~77.2 | — | ● 83.5 | ● |
| Example 3 | $C_4H_9$—⬡— | F | ● 72.5~73.7 | — 72.5 73.7 | ● 83.3 | ● |
| Example 4 | $C_5H_{11}$—⬡— | F | ● 74.4 | ● 80.1 | ● 92.3 | ● |
| Example 5 | $C_2H_5$—⬡— | Cl | ● 85.5~86.6 | — | — | (60.6) ● |
| Example 6 | $C_4H_9$—⬡— | Cl | ● 91.0~92.0 | — | ● 92.8 | ● |
| Example 7 | $C_7H_{15}$—⬡— | F | ● 61.7~62.8 | — | — | (10.0)* ● |

TABLE 1-continued

| | Constitution of ester derivative | | Phase and transition (°C.) | | | |
|---|---|---|---|---|---|---|
| | R¹ | X | C | Sm | N | I |
| Example 8 | 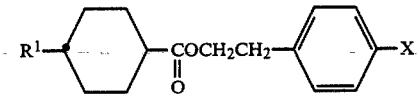 | Cl | ● 61.8~62.5 | — | — (19.0)* | ● |
| Example 9 | $C_7H_{15}$— | F | ● 21.1~22.2 | — | — (−64.0)* | ● |
| Example 10 | $C_8H_{17}$— | F | ● 26.6~27.9 | — | — (−65.0)* | ● |
| Example 11 | $C_7H_{15}$— | Cl | ● 48.0~49.6 | — | — (−44.0)* | ● |
| Example 12 | $C_8H_{17}$— | Cl | ● 47.7~48.6 | — | — (−32.0)* | ● |

Application Example 1

A liquid crystal composition consisting of
4-pentyl-4'-cyanobiphenyl: 51% by weight,
4-heptyl-4'-cyanobiphenyl: 32% by weight and
4-octyloxy-4'-cyanobiphenyl: 17% by weight,
has a nematic mesomorphic range of 0° C.–44° C. and a viscosity at 20° C. of 40 cp. A liquid crystal composition consisting of 90 parts by weight of the above composition and 10 parts by weight of trans-4-(trans-4-propyl-cyclohexyl) cyclohexanecarboxylic acid β-(4-fluorophenyl) ethyl ester prepared in Example 2 exhibited a nematic mesomorphic range of −5° C.−+47° C. and a viscosity at 20° C. of 38 cp, that is, the nematic mesomorphic range was extended toward its higher temperature region and lower temperature region, and also the viscosity was reduced.

Application Example 3

A liquid crystal composition consisting of
4-pentyl-4'-cyanobiphenyl: 46% by weight,
4-heptyl-4'-cyanobiphenyl: 29% by weight,
4-octyloxy-4'-cyanobiphenyl: 14% by weight and
4-pentyl-4'-cyanoterphenyl: 11% by weight,
has a nematic mesomorphic range of −5° C.−+64° C. and a viscosity at 20° C. of 48 cp. A liquid crystal compositon consisting of 90 parts by weight of the above compositon and 10 parts by weight of trans-4-heptylcyclohexanecarbonylic acid β-(4-chlorophenyl) ethyl ester prepared in Example 11 exhibited a nematic mesomorphic range of −10° C.−+55° C. and a viscosity at 20° C. of 43 cp, that is, the nematic mesomorphic range was extended toward its lower temperature region, and also the viscosity was reduced.

What we claim is:

1. A trans-4-substituted-cyclohexanecarboxylic acid β-(4-halogenophenyl) ethyl ester derivative expressed by the general formula

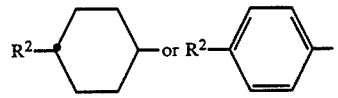

wherein R¹ represents R²,

R²—⟨cyclohexyl⟩— or R²—⟨phenyl⟩— wherein R² represents an alkyl group or an alkoxy group, each having 1 to 15 carbons and X represents F or Cl.

2. A liquid crystal compositon comprising a mixture of compounds at least one of which is a compound as set forth in claim 1.

* * * * *